United States Patent

[11] 3,628,134

[72] Inventor Robert A. Andersen Palo Alto, Calif.
[21] Appl. No. 46,982
[22] Filed June 17, 1970
[45] Patented Dec. 14, 1971
[73] Assignee Sound Technology Cupertino, Calif.

[54] FREQUENCY MODULATION ALIGNMENT SYSTEM
7 Claims, 6 Drawing Figs.

[52] U.S. Cl. .......... 324/57 R, 332/20
[51] Int. Cl. .......... G01r 29/00, H03c 3/08
[50] Field of Search .......... 324/57, 77, 57 H, 77 B, 77 C–77 S; 325/363

[56] References Cited

UNITED STATES PATENTS 2,678,383 5/1954 Frantz .......... 325/363
2,714,657 8/1955 Stein .......... 325/363

*Primary Examiner*—Herman Karl Saalbach
*Assistant Examiner*—Marvin Nussbaum
*Attorney*—Flehr, Hohbach, Test, Albritton & Herbert ABSTRACT: A frequency modulation alignment system modulates a carrier signal, which is tuned to the same frequency as FM receiver to be tested, with dual frequencies, one of which is a relatively low-sweep frequency and the other of which is a higher audio frequency. The vertical input of an oscilloscope is coupled to the audio frequency which has been demodulated by the receiver. The horizontal input is driven by the sweep frequency to produce a pattern where distortion is indicated by the variation from a horizontal line of the peaks of the signal display. An effectively linear modulator is provided for the generation of the modulated carrier signal by a modulator which has its modulating signal predistorted to compensate for its own nonlinearities. A piston attenuator controls the RF output of the modulated carrier signal.

INVENTOR.
ROBERT A. ANDERSEN
BY
Flehr, Hohbach, Test, Albritton & Herbert
ATTORNEYS INVENTOR.
ROBERT A. ANDERSEN
BY Fliehr, Hohbach, Test, Albritton & Herbert
ATTORNEYS INVENTOR.
ROBERT A. ANDERSEN
BY
Flehr, Hohbach, Test, Albritton & Herbert
ATTORNEYS INVENTOR.
ROBERT A. ANDERSEN
BY
Flehr, Hohbach, Test,
Albritton & Herbert
ATTORNEYS

FREQUENCY MODULATION ALIGNMENT SYSTEM

BACKGROUND OF THE INVENTION

The present invention is directed to a system for the alignment of frequency modulation (FM)-type -type receivers.

It has been recognized that a straight line or linear transfer characteristic is desirable for both FM-type modulators and demodulators since the accuracy of the data transmission is a function of the linearity of the transfer characteristic. In an article entitled "New Techniques in FM Linearity Meausrement" by John P. Van Duyne appearing in the *The Notebook*, Number 33, a publication of the Boonton Radio Company, a method of designing a linear frequency modulator is disclosed. The article states that one method to measure the transfer characteristic nonlinearity of a modulator to a high degree of precision is to measure the results of demodulation through a perfectly linear demodulator. However, it is difficult, the article continues, to produce a linear demodulator without having a perfect modulator to measure it.

It is suggested that a perfectly linear modulator may be synthesized by the mixing of two carrier frequencies which are modulated simultaneously but separately. The two modulating signals consist of a first modulating voltage of relatively high frequency and low amplitude and a second modulating voltage with the opposite characteristics. The resulting demodulated signal provides on an oscilloscope an instantaneous display of the change of slope of the nonlinear transfer characteristic of the demodulator.

While the foregoing dual technique is satisfactory for laboratory use it is complex and costly for measuring, for example, the nonlinearity of home-type FM receivers.

OBJECTS AND SUMMARY OF THE INVENTION

It is, therefore, an object of the present invention to provide an improved system for measuring the nonlinearity of an FM-type demodulator.

It is another object of the invention to provide a system as above which is economical and simple to operate.

In accordance with the above objects there is provided a frequency modulation (FM) alignment system for alignment of a communications receiver of the FM type having a carrier frequency signal input and a demodulated signal output. Such a system is for use with a cathode-ray tube display device having vertical and horizontal inputs. The system includes nonlinear FM modulator/oscillator means for generating a carrier signal, $f_c$, having the same frequency to which the receiver is tuned. Oscillator means are provided for generating a first modulating signal, $f_o$. Second oscillator means generate a second modulating signal, $f_s$, having a frequency much less than $f_o$ and an amplitude much greater than $f_o$. Means are provided for superimposing $f_s$ on $f_o$. Predistortion means couple superimposed $f_o$ and $f_s$ to the modulator/oscillator means for frequency modulating $f_c$. The predistortion means for $f_o$ and $f_s$ compensates for the nonlinearity of the modulator/oscillator means. Means are included for coupling the modulated $f_c$ of the modulator/oscillator means to the carrier frequency signal input of the receiver and means are adapted to be coupled to the demodulated signal output of the receiver for providing the signal $f_o$ whereby such signal $f_o$ and signal $f_s$ when coupled to the inputs of the display device provide an indication of the nonlinearity of the receiver.

DETAILED DESCRIPTION OF THE PREFERRED EMBODIMENT

Figure 1:
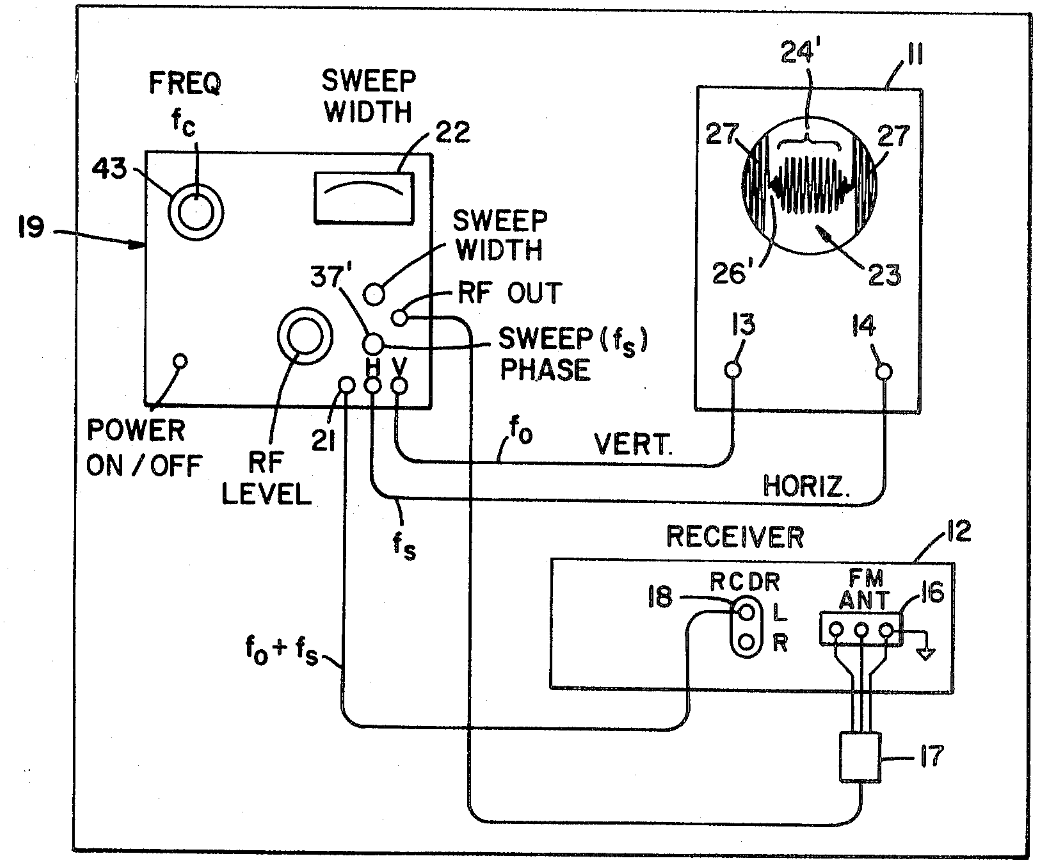
FIG. 1 is a block diagram showing the system of the present invention in actual use.

FIG. 1 illustrates the system of the present invention as it would be used with an oscilloscope 11 and frequency modulation-type receiver 12. Scope 11 includes a vertical input 13 and a horizontal input 14. Receiver 12 includes a carrier frequency signal input 16, in this specific case it is the antenna input, which coupled to the input line by an antenna matching network 17. The receiver also includes an audio or demodulated signal output 18 which specifically may be one of the tape recorder output channels of a typical home FM communications receiver.

The control panel of an FM signal generator 19 is illustrated which produces several types of signal outputs which are coupled to both the oscilloscope 11 and receiver 12. A radio frequency (RF) output terminal is coupled to antenna 16 through matching network 17. Vertical and horizontal output terminals, V and H, are coupled to respective terminals 13 and 14 of oscilloscope 11. The audio output terminal 18 of receiver 12 is coupled to input terminal 21. This coupling line carries the audio output of the receiver which is under test for the linearity of its demodulator.

Other controls shown on control panel 19 of the FM generator includes an RF level control to control the level at the RF output terminal, a sweep width control which determines the magnitude of the low-frequency modulating signal, $f_s$, a frequency control 43 which determines the carrier frequency, $f_c$, produced at the RF output terminal and a power on/off switch. A meter 22 indicates the sweep width which is determined by the sweep width control.

Figure 1A:
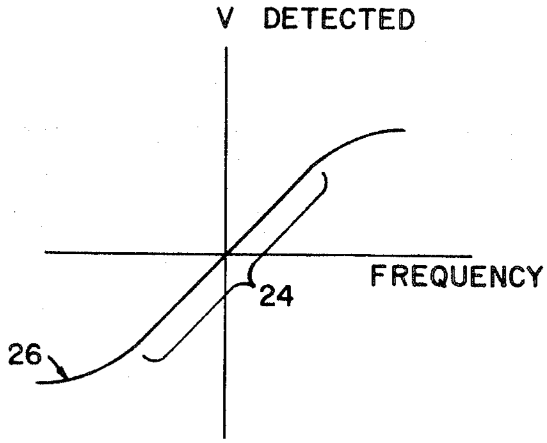
FIG. 1A is an example of a typical S-curve characteristic.

The oscilloscope display 23 is created by the typical S-curve response, as illustrated in FIG. 1A, of the FM demodulator in receiver 12. The linear portion 24 of the S-curve produces the displayed portion 24'. If the S-curve is truly linear, the peaks of the various waveforms in segment 24' will lie in a horizontal line. Any variation from this horizontal configuration indicates distortion which could be corrected by realignment of either or both the IF strip and FM demodulator of the receiver. Where the S-curve of FIG. 1A approaches a zero slope, as for example at 26, the waveform as shown at 26' decreases to zero. The outer bands 27 are in the noise range outside the bandpass of the receiver.

Figure 2:
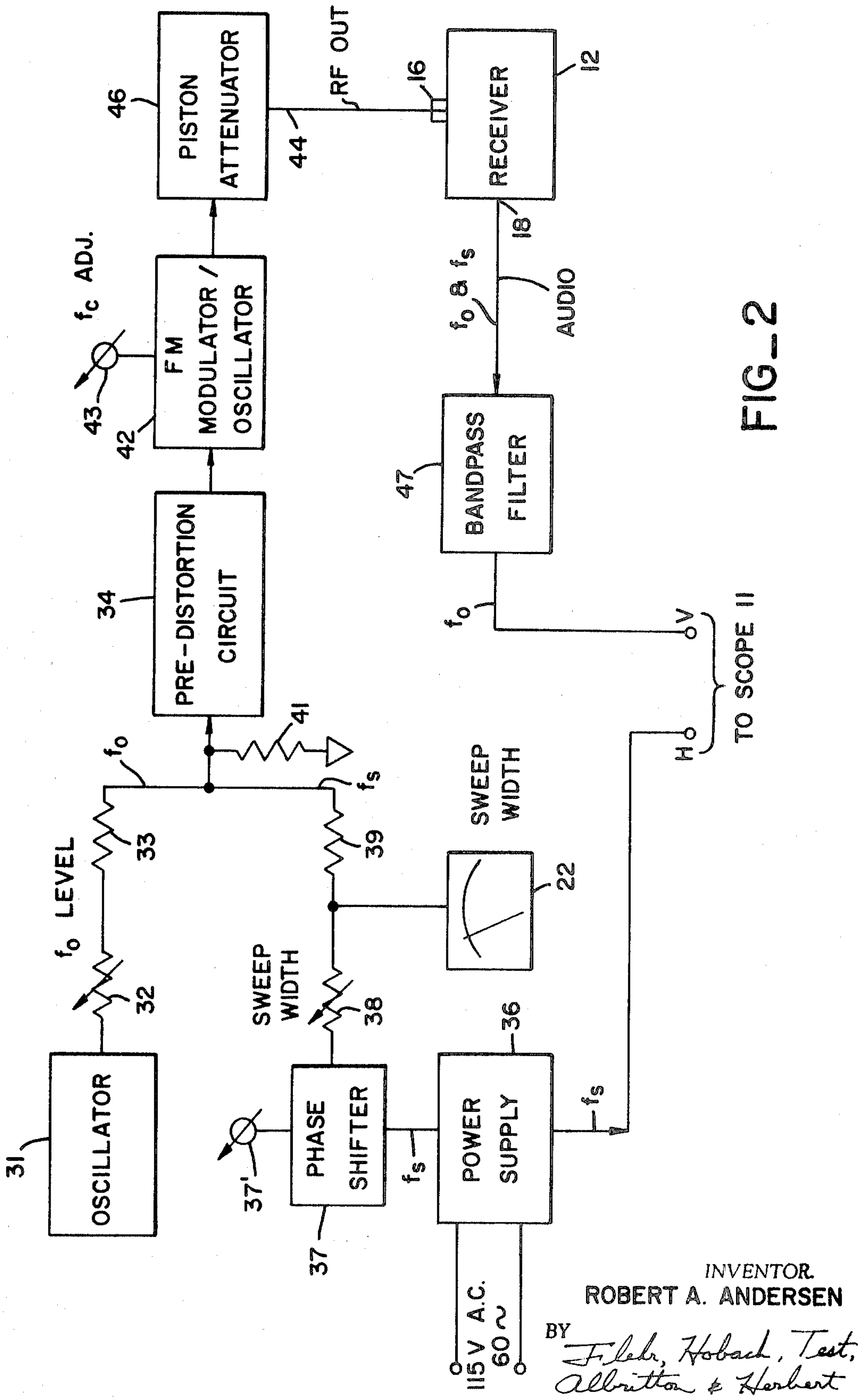
FIG. 2 is a more detailed block diagram of a portion of FIG. 1.

The specific method by which the display 23 is produced is more clearly illustrated in FIG. 2. An oscillator 31 generates a first modulating signal, $f_o$, whose level is controlled by an attenuator 32 which is coupled through a series resistor 33 to a predistortion circuit 34. Superimposed on the $f_o$ signal is a second modulating signal, $f_s$, which is derived from a power supply unit 36. This is normally coupled to a standard 115-volt AC 60-Hertz power source. Thus, $f_s$ will be of the order of 60 Hertz. The $f_s$ output signal is coupled to the predistortion circuit 34 through a phase shifter 37 having a phase shift control 37' through an attenuator 38 which controls the amplitude of $f_s$ and through an adding resistor 39 to predistortion circuit 34. The superimposing of $f_s$ on $f_o$ is completed by the addition of the grounded resistor 41 which completes the adding network which also includes resistors 33 and 39. The amplitude of the signal $f_s$ is indicated by the meter 22.

Predistortion circuit 34 is for the purpose of compensating for the inherent nonlinearity of the FM modulator/oscillator unit 42. This unit produces a carrier frequency $f_c$ which is determined by the frequency adjustment control 43 which corresponds to control knob on the control panel 19. The carrier frequency is adjusted to the same frequency to which receiver 12 is tuned. The input modulating signals to modulator/oscillator 42 are the combined $f_o$ and $f_s$ signal which produce an RF output signal at 44 which is $f_c$ modulated with $f_o$ and $f_s$. This signal is attenuated by a piston-type attenuator 46.

The RF signal coupled into receiver 12 is, of course, demodulated in a normal manner and the output at terminal 18 is an audio frequency consisting of $f_o$ and $f_s$. The $f_s$ frequency is filtered out by a series-connected band-pass filter 47 and the output of the band-pass filter is in essence the vertical, V, output as shown in FIG. 1. The horizontal output is the signal $f_s$ which is derived from power supply 36. Both of these signals are coupled to the oscilloscope 11 as illustrated in FIG. 1.

REferring now both to FIG. 1, 1A and 2 the foregoing system produces a direct instantaneous indication of distortion caused by nonlinearities in the S-curve of FIG. 1A which is the transfer characteristic of the demodulator of the receiver 12 under test. This, in effect, is accomplished by the use of a signal $f_o$ which, for example, may be 10 kilohertz which is adjusted to a level, for example, to provide a peak deviation of 7.5 kilohertz with respect to the carrier $f_c$. The signal $F_s$ being superimposed on $f_o$, in effect, sweeps the $f_o$-modulated carrier signal along the S curve of FIG. 1A. Thus, any nonlinearities in the S-curve are indicated on the oscilloscope display 23 as a change of amplitude. It is apparent that the sweep signal, $f_s$, necessarily has an amplitude much greater than $f_o$ and a frequency much less than $f_o$.

The sweep width, which is, of course, the magnitude of $f_s$, determines what portion of the S-curve of FIG. 1A is to be used as the operating portion. Adjustment of the RF output level also produces irregularities in the display if receiver states are caused to overload. In any case, it is apparent that adjustment of the RF output level and the sweep width may be used to provide instantaneous information as to any nonlinearity of the S-curve of the receiver demodulator.

The foregoing two frequency or dual-sweep measurement method using one modulating voltage superimposed on another are basically disclosed in the foregoing Boontom Radio article. However, such an instantaneous display for practical purposes is achieved only with the use of two separate signal generators both generating modulated carrier frequencies which beat against each other to produce an IF frequency. In contrast, in the present invention the dual-sweep system is achieved by the use of a single FM modulator/oscillator 42 which since a perfectly linear modulator cannot be easily achieved has coupled to its modulating input the predistortion circuit 34 which distorts the superimposed $f_o$ and $f_s$ signals to compensate for the nonlinearity of the modulator/oscillator 42. This provides a simpler circuit which is significantly less expensive and easier to use.

Figure 3:
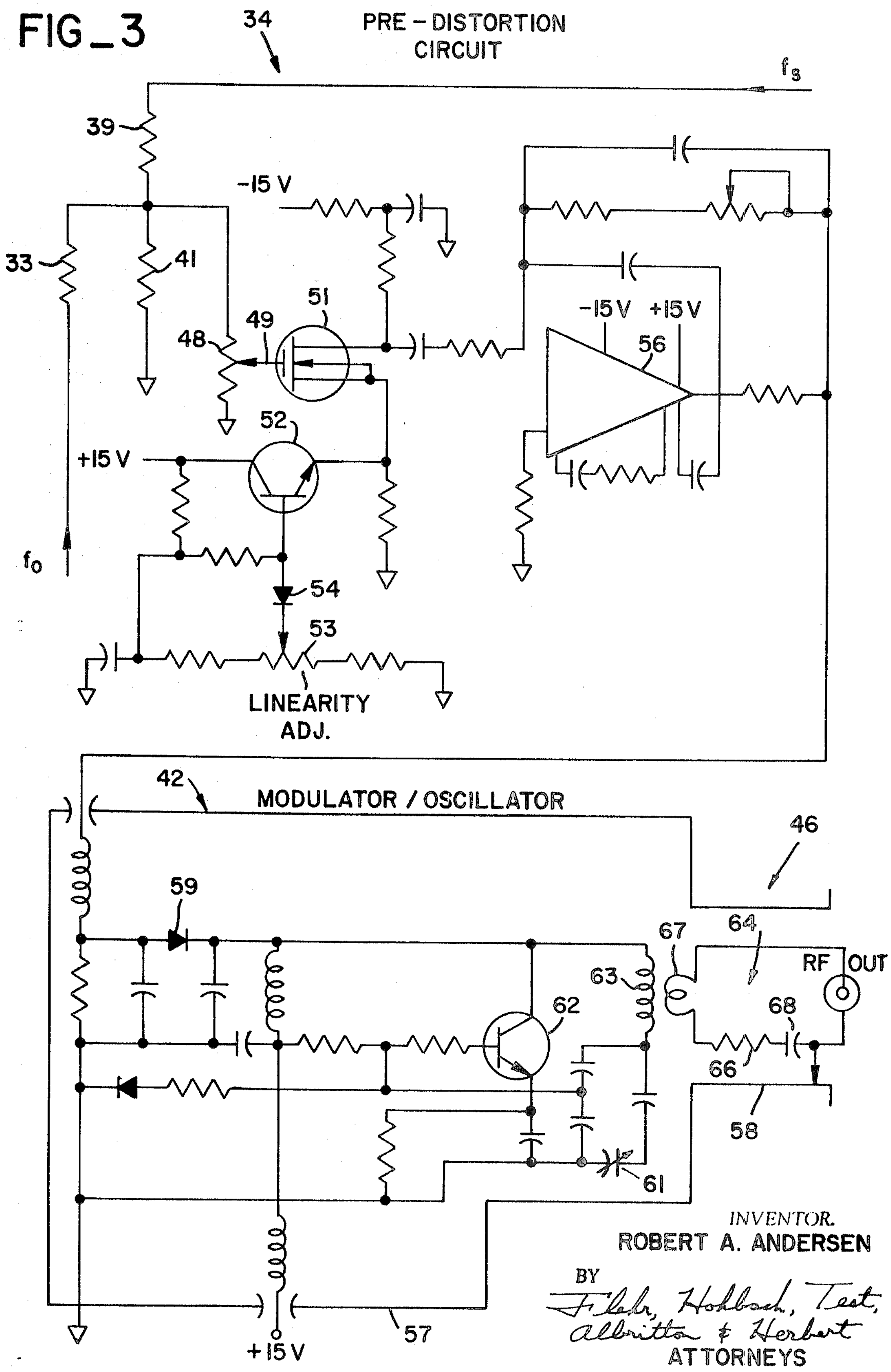
FIG. 3 is a circuit schematic of two blocks of FIG. 2.

The specific circuitry of predistortion circuit 34 and modulator/oscillator 42 with the piston attenuator 46 is shown in FIG. 3. As also illustrated in FIG. 2, $f_o$ and $f_s$ are superimposed on one another by the networks 33, 39 and 41. The superimposed signals are coupled through a potentiometer 48 to the base input 49 of an MOS-type field effect transistor 51. This is biased into a region to best compensate for the nonlinearity of the modulator/oscillator 42 by means of an emitter follower-connected transistor 52. This transistor has its emitter coupled to the source input of the field effect transistor 51 and provides a low-impedance bias source. The bias current is adjustable by means of a potentiometer 53 which is coupled through diode 54 to the base input of transistor 52. The drain output of the linearity adjustment field effect transistor 51 is coupled to an operational amplifier 56 which buffers the linearizing amplifier 51 and also provides a low-impedance drive to the modulator/oscillator unit 42. This low-impedance output coupling provides a wideband drive for the modulator unit.

Modulator/oscillator unit 42 is entirely enclosed within a RF metal shield 57. A portion of this shield 58 also forms the cylinder of piston attenuator 46. The RF oscillator portion of unit 42 includes a varactor diode 59 connected to the LC tank circuit as shown which has a capacitance which is related to the voltage. The tank circuit is tuned by variable capacitor 61 which is controlled by the frequency adjustment knob 43 as illustrated in FIGS. 1 and 2. Transistor 62 serves as the active component of the oscillator circuit. The transistor 62 oscillates at a frequency determined by the capacitance feedback to its base which includes the variable capacitor 61 and other associated capacitors.

Attenuator 46 has mounted at one end of the cylindrical tube 58 an inductive winding 63. This inductively couples to the probe 64 which is slidably mounted in tube 58. The probe includes a resistor 66 having leads indicated as an inductor 67 and a capacitor 68. All of these components are coupled by a coaxial cable to the RF output terminal so indicated.

Figure 4:
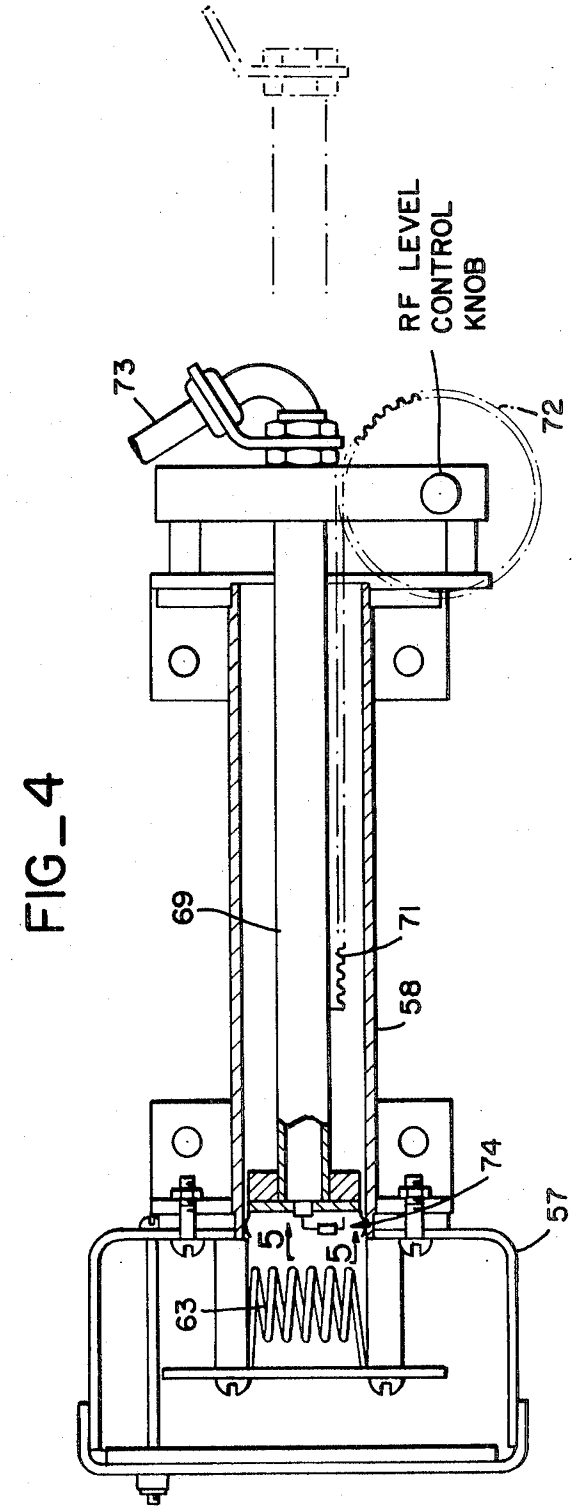
FIG. 4 is a cross-sectional view showing the mechanical operation of one of the blocks of FIG. 2.
Figure 5:
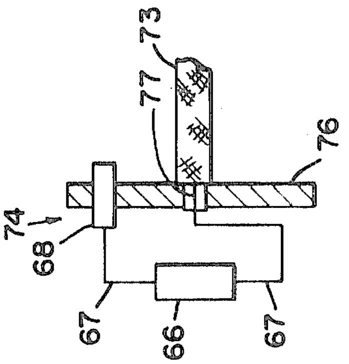
FIG. 5 is an enlarged cross-sectional view of a portion of FIG. 4 taken along line 5—5 but rotated 90°.

The mechanical configuration of attenuator 46 is more fully illustrated in FIGS. 4 and 5 where the shield can 57 is shown as containing coil 63. The tube 58 has slidably mounted within it a piston rod 69 which has mounted on it a rack gear 71 rotated by a pinion gear 72 coupled to the RF level control knob which is also shown in FIG. 1. A single rotation of the control knob moves piston 69 its entire length of travel. Within piston tube 69 is a coaxial cable 73 which terminates at probe end 74. This is shown in greater detail in FIG. 5 where the probe includes a conductive disk 76 mounted to the shielding portion of coaxial cable 73. The center conductor 77 of the coaxial cable is coupled to one lead 67 of the carbon-type resistor 66 which has its other lead 67 coupled to the feedthrough capacitor 68. These components, of course, are similarly numbered in FIG. 3. The feedthrough capacitor is conductively mounted to disk 76. The leads 67 of resistor 66 as discussed in connection with FIG. 3 serve in effect as an inductive coupling to the pickup coil 63.

In operation, once the display 23 has been centered, the receiver discriminator and IF strip can be aligned. The amplitude of the 10-kilohertz signal $f_o$ at a given point on the horizontal axis is proportional to the S-curve slope (see FIG. 1A) at the corresponding carrier frequency. The receiver is, of course, aligned to have a pattern which is as flat as possible; in other words, having a constant amplitude in the required passband. For ordinary FM reception this is 150-kilohertz deviation peak to peak. The pattern should also be symmetrical about the center frequency. Normally, the discriminator adjustments will have the greatest effect on flatness; however, a detuned IF circuit will degrade the pattern and shift it off to one side. In a critical alignment, final adjustment of the discriminator secondary should be done with sweep width reduced to about 200 kilohertz and scope sensitivity turned up with a corresponding vertical offset so that the top of the pattern can be viewed by itself.

During the alignment process, the RF level control knob should be rotated through its entire range to insure that the sweep pattern maintains its flatness over this range. With a piston-type attenuator in conjunction with the single-revolution-rotation control knob it is possible to produce this variation while still maintaining one hand free to make necessary alignment adjustments.

A proper pattern to be displayed is a sweep pattern which is symmetrical rather than one which has precipitous drops at the edge. This is because an abrupt loss of linearity means that the tuning will be critical and that a small amount of drift will cause abrupt distortion. It is, therefore, best to provide a more gradual pattern even at the sacrifice of some distortion for better overall operation.

Thus, the present invention provides an improved FM alignment system which is relatively inexpensive and simple in operation. The predistortion circuit provides an economical way of compensating for the nonlinearity present in all modulators. Easy operator control during the adjustment of the receiver is provided by the single-revolution piston attenuator which is used in the present system.

I claim:

1. A frequency modulation (FM) alignment system for alignment of a communications receiver of the FM type having a carrier frequency signal input and a demodulated signal output, such system being for use with a cathode-ray tube display device having vertical and horizontal inputs, said system comprising: nonlinear FM modulator/oscillator means for generating a carrier signal, $f_c$, having the same frequency to which said receiver is tuned; first oscillator means for generating a first modulating signal, $f_o$; second oscillator means for generating a second modulating signal, $f_s$, having a frequency much less than $f_o$ and an amplitude much greater than $f_o$; means for superimposing said $f_s$ on said $f_o$; predistortion means for coupling said superimposed $f_o$ and $f_s$ to said modulator/oscillator means for frequency modulating $f_c$, said predistortion means distorting $f_o$ $f_s$ to compensate for said nonlinearity of said modulator/oscillator means; means for coupling the modulated $f_c$ of said modulator/oscillator means to said carrier frequency signal input of said receiver; and means adapted to be coupled to said demodulated signal output of said receiver for providing said signal $f_o$ whereby such signal $f_o$ and said signal $f_s$ when coupled to said inputs of said display device provide an indication of the nonlinearity of said receiver.

2. A system as in claim 1 where said means for coupling said modulator/oscillator means to said carrier input of said receiver includes attenuator means for attenuating said modulated carrier signal, $f_c$.

3. A system as in claim 2 where said attenuator means is of the piston type and includes a control knob coupled to the piston, less than a single revolution of the knob causing said level of said modulated carrier signal to be varied over the full range of signal levels to which said receiver is subjected in normal use.

4. A system as in claim 2 where said attenuator means is of the piston type including a cylinder having a signal source fixed at one end, a piston movable in said cylinder toward said source and having at the end within the cylinder probe means for coupling with said source means said probe including an integrally mounted capacitor to protect against electrical shorts or high voltage in the system.

5. A system as in claim 4 where said attenuator means includes a coaxial cable for carrying said $f_c$ signal, said probe means including a conductive disc mounted on the end of said piston and coupled to said coaxial cable, said capacitor being of the feedthrough type and conductively mounted to said disc, said probe means including a resistor having one lead coupled to said coaxial cable and the other lead coupled to said capacitor, said resistor leads and resistor body inductively coupling with said inductive pickup.

6. A system as in claim 1 where said predistortion means includes an operational amplifier having a low-impedance output for coupling to said modulator/oscillator means, said operational amplifier being driven by field-effect transistor means, said predistortion means also including adjustable biasing means for said field-effect transistor means the adjustment of said baising means adjusting the distortion of said predistortion means to compensate for said nonlinearity of said modulator/oscillator means.

7. A system as in claim 6 where said biasing means includes an emitter follower transistor amplifier providing a low-impedance coupling to said field-effect transistor means.

* * * * *